Dec. 11, 1951 — W. H. HEATON, JR — 2,578,245
AUTOMATIC CHUCK

Filed March 12, 1947 — 2 SHEETS—SHEET 1

Inventor
William H. Heaton, Jr.
By Clarence A. O'Brien
and Harvey B. Jacobson
Attorneys Dec. 11, 1951 W. H. HEATON, JR 2,578,245
AUTOMATIC CHUCK
Filed March 12, 1947 2 SHEETS—SHEET 2

Inventor
William H. Heaton, Jr.
By Clarence A. O'Brien
and Harvey B. Jacobson
Attorneys Patented Dec. 11, 1951

2,578,245

UNITED STATES PATENT OFFICE 2,578,245

AUTOMATIC CHUCK

William H. Heaton, Jr., Chattanooga, Tenn.

Application March 12, 1947, Serial No. 734,124

3 Claims. (Cl. 279—33)

This invention relates generally to automatic chucks, and more particularly to a driving attachment for lathe production work, securable to the face plate or adapter of a lathe and having a manually operable cover plate whereby a plurality of spring loaded pawls may be made to engage or disengage one end of work supported on a live center in said face plate.

It is well understood that the prior art contains automatic chucks employing a plurality of pawls and a basic patent for such structure is not hereby sought, but what is sought to be protected is the herein described improvement and refinement of automatic chuck structure whereby the same is made more convenient to use and generally more efficient and reliable.

It is an object of this invention to provide an automatic chuck with a plurality of pawls spring loaded in such a manner and manipulable by an exterior cover plate so that the said pawls may be retracted or moved inwardly into work engaging position by a simple manual movement of said cover plate.

Another object of this invention is to provide an improved mounting for such a cover plate, in combination with stop members associated therewith to make the operative manipulation thereof extremely simple.

Another object of this invention is to provide pawls having arcuate work contacting faces with diamond shaped knurling thereon and so pivoted on a disc plate securable to the base plate of a lathe that these pawls will be normally urged into work contacting positions by centrifugal force when the lathe is operating, the gripping action of these pawls varying directly proportionally to the resistance of the turning of the work caused by the action of the cutting tool of the lathe.

With these objects, and other objects which will become more apparent as this description proceeds, definitely in view, this invention resides in certain novel features of construction, combination and arrangement of parts and portions as will be hereinafter described in detail and particularly set forth in the appended claims, reference being had to the accompanying drawings which form a material part of this application, and in which:

Figure 6:
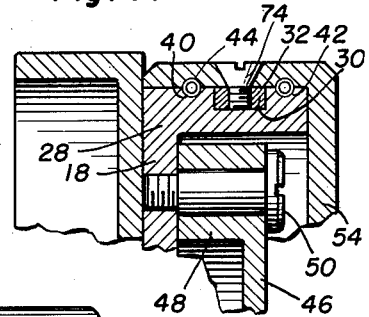
Figure 3:
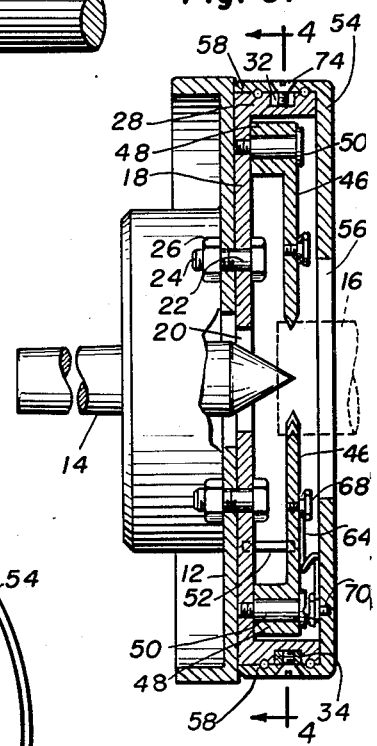
Figure 3 is a vertical sectional view taken on the line 3—3 through the structure shown in Figure 2.
Figure 2:
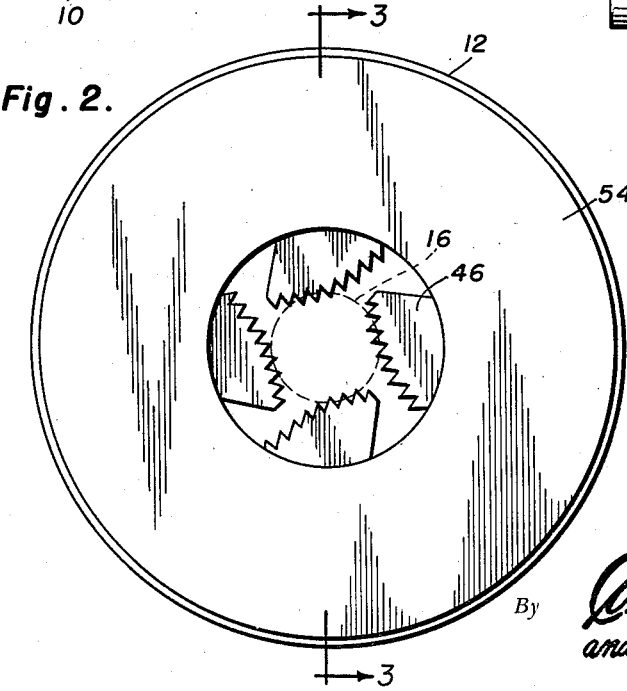
Figure 2 is a front elevational view of this invention, showing the pawls in work engaging position, said work being indicated in section.
Figure 7:
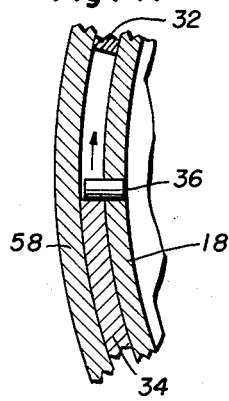
Figure 8:
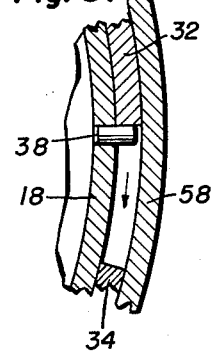

Figure 6 is a fragmentary enlarged detail view, of vertical sectional character, of an upper portion of the automatic chuck structure, adapted to facilitate the disclosure of how the cover plate is rotatably mounted on said disc plate and how said pawls are pivotally secured to the disc plate; and, Figure 7 and Figure 8 are fragmentary detail views of vertical sectional character and adapted to illustrate the construction involving stop members used to define limits of rotation of the cover plate relative to said disc plate.

Similar characters of reference designate similar or identical parts and portions throughout the specification and throughout the several views of the drawings.

Referring now to the drawings in detail, which drawings illustrate one embodiment of this inventive concept and are made to illustrate a practical chuck constructed according to the principles of this invention, it will be noted that a head stock 10, provided with a normal complement of a face plate 12 and live center 14, is shown with a cylindrical section of work 16 operatively mounted therein, it being understood, of course, that other portions of the lathe including the tail stock and tool assembly will be used in order to support and operate upon the work 16 in combination with the improved automatic chuck hereinafter described.

A disc plate 18, centrally apertured as at 20 to accommodate the center 14 and apertured as at 22, preferably at four points, to allow the attachment of the disc plate to the face plate 12 by means of bolts 24 and nuts 26. Said disc plate 18 is formed with an integral annular rim 28 disposed normally to the said plate and provided with an exterior annular groove 30 to accommodate two substantially semi-circular plate members 32 and 34 which function as stop members in conjunction with other pin-type stop members 36 and 38 rigidly fixed at two diametrically disposed points in the rim 28, as clearly illustrated in Figures 7 and 8. Semi-circular ball races 40 and 42 are also provided in the exterior face of this rim 28, being spaced on either side of the annular groove 30. Any suitable means, such as the provision of transversely disposed channels closable by similarly shaped plate members, not shown in the drawings, may be used to allow the insertion of ball bearings 44 into the races 40 and 42, during the assembly of the device.

A plurality of pawls 46 of generally triangular plate character and provided with annular spacer bosses 48 are drilled to provide pivotal bearing means for the pawls, the threaded studs 50 being provided as journal members to secure these pawls in spaced relation, and preferably diametrically disposed in two pairs on the disc plate 18, the latter being drilled and tapped to receive the threaded ends of the studs 50. A plurality of dowel pins 52 are rigidly secured in spaced relation on the plate 18, being positioned to function as stop members limiting the outward movement or retraction of the individual pawls, the action of these pins being ancillary to the action of the stop members hereinbefore described. The work engaging surfaces of these pawls are generally arcuate and each is provided with a plurality of diamond shaped teeth.

Figure 1:
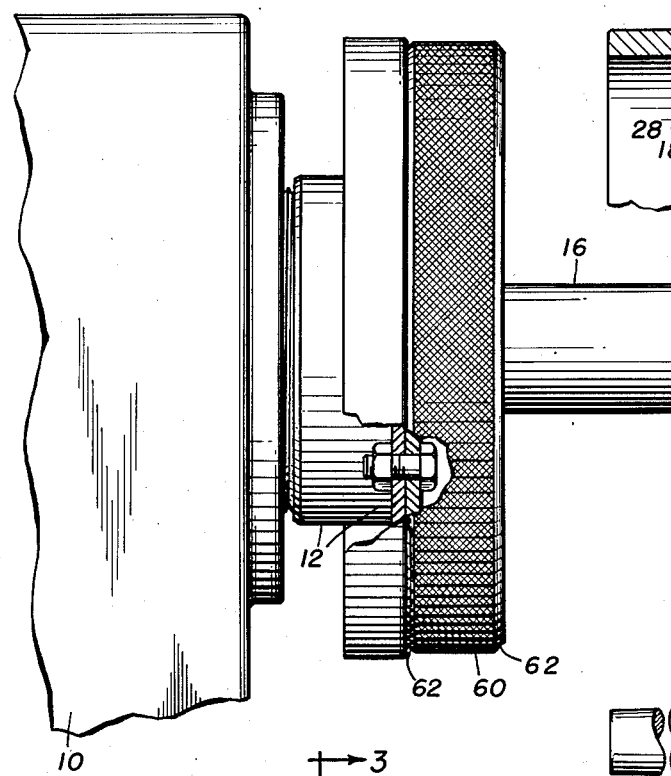
Figure 1 is a fragmentary view of the head stock portion of a lathe and work supported therein, with the instant invention secured in operative position thereon, the view being essentially side elevational in character, and rim portions of automatic chuck being broken away to indicate how this invention is secured to the face plate.

A cover plate 54, centrally apertured as at 56, is provided with an annular flange 58 of an internal diameter substantially equal to the external diameter of said annular rim 28, the annular flange being provided with a pair of spaced ball races corresponding in size and position with the ball races 40 and 42 in said annular rim, the function thereof being readily inferred from the foregoing and consisting primarily in facilitating the relative movement of the said flange and said rim. In this connection, it may be noted that the exterior of the annular flange is preferably knurled as indicated at 60 in Figure 1 and this flange is also preferably beveled on both outer edges thereof as indicated at 62. It will be understood that the width of the annular flange 58 corresponds substantially with the dimension of the disc plate 18 and annular rim 28, so that in the assembled device the inner periphery of the annular flange 58 shuts the face plate 12 or an adapter thereon, there being, of course, a reasonable clearance provided.

Each pawl is provided with an elongated spring 64 with a single coil intermediate the ends thereof, as indicated at 66, and the ends of the springs are individually secured by threaded stud members 68 and pins 70 to the pawls and to the interior surface of the cover plate 54, these springs 64 being of such character and length that the pawls are individually retracted thereby into the position where the edge of each pawl is in contact with the dowel pins 52 hereinbefore described. The functioning of the stop members 32—38 will now be clear, when it is noted that the members 32 and 34 are secured to the annular flange 58 by set screws 74, the drawings illustrating provision of six of these set screws, the ends of the members 32 and 34 abutting the pins 36 and 38 selectively when the cover plate 54 is rotated relative to the disc plate 18 into the two limiting positions. It will also be clear that this relative movement of the two plates will yieldably urge the pawls inwardly or outwardly through the action of the springs 64.

Figure 4:
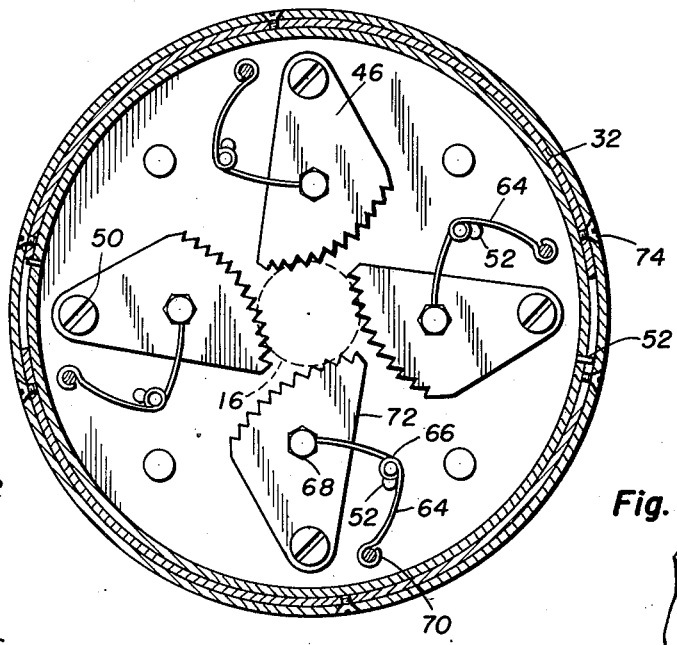
Figure 4 is a vertical sectional view taken on the line 4—4 in Figure 3.
Figure 5:
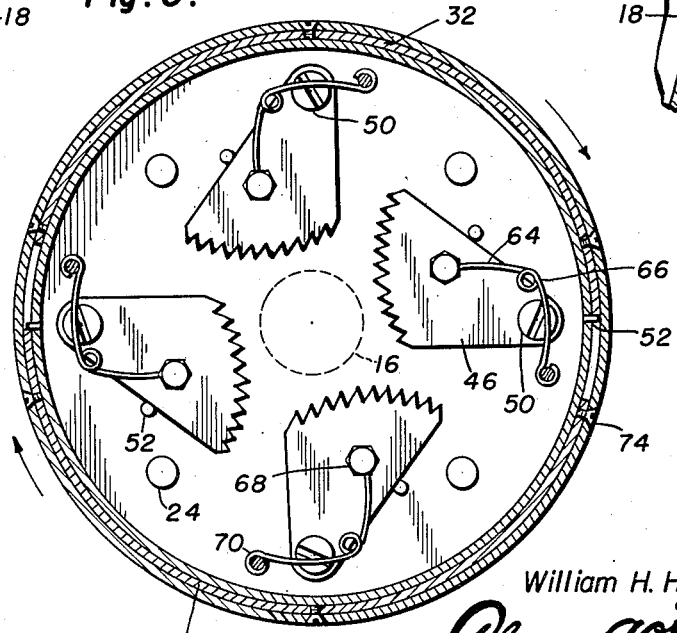
Figure 5 is a similar view but showing the cover plate revolved relative to the disc plate carrying the pawls, the pawls being shown in corresponding position, that is, retracted from the work.

It will be understood that the normal rotation of a lathe is clockwise when viewed from the tail stock end, hence the movement of this chuck will be counter-clockwise as viewed in Figures 4 and 5; the rotational force applied to the work 16 will, therefore, tend to turn the pawls on their pivot points in a direction which will cause these pawls to grip the work more tightly, that is, dig into the work more deeply as the strain placed on the work by the cutting tool is increased.

The method of operation of this device may be readily inferred from the foregoing description of the mechanical details thereof but, in recapitulation, it should be noted that the knurled flange 58 may be turned away by the operator of the lathe, relative to the rim 28, to disengage the pawls 46 from the work, or to retract these pawls preparatory to insertion of new work into the chuck. When such new work has been inserted the knurled flange 58 is rotated in the opposite direction and the pawls 46 will engage one end of the work, the tighter engagement of the pawls necessary to turn the work against the resistance of the cutting tool being automatically applied.

Though there has been shown a particular embodiment of this invention, this application is not limited to this particular embodiment, but it is desired to include in the scope of this invention the construction, combination and arrangement of parts and portions substantially as set forth in the appended claims.

Having thus described this invention what is claimed as new and desired to be secured by Letters Patent is:

1. An automatic chuck including a centrally apertured disc plate directly securable to the face plate of a lathe and having an outturned annular rim, a plurality of radially disposed similar pawls pivotally mounted on studs secured to said disc plate, a centrally apertured cover plate having an inturned annular flange rotatably secured on said annular rim, pins secured on said cover plate, springs terminally secured to stud members carried by each of said pawls and to said pins, whereby said pins are shifted from one side to the other of straight lines drawn through the corresponding studs and stud members and said pawls are individually and independently urged to pivot inwardly and to retract according to rotary movement of said cover plate relative to said disc plate.

2. An automatic chuck including a centrally apertured disc plate directly securable to the face plate of a lathe and having an outturned annular rim, a plurality of radially disposed similar pawls pivotally mounted on studs secured to said disc plate, a centrally apertured cover plate having an inturned annular flange rotatably secured on said annular rim, springs terminally secured to stud members carried by said pawls and pins secured to said cover plate, whereby said pins are shifted from one side to the other of straight lines drawn through the corresponding studs and stud members and said pawls are urged to pivot inwardly into contact with work placed in the lathe, and independently operating stop means to limit the movement of the cover plate relative to said rim and the retraction of said pawls.

3. An automatic chuck including a centrally apertured disc plate directly securable to the face plate of a lathe and having an outturned annular rim, a plurality of radially disposed similar pawls pivotally mounted on studs secured to said disc plate, a centrally apertured cover plate having an inturned annular flange, an annular channel in said rim, arcuate plates sliding in said channel and secured on said annular flange, springs carried by said pawls and pins secured to said cover plate whereby said pins are shifted from one side to the other of straight lines drawn through the corresponding studs and stud members and said pawls are urged to pivot inwardly into contact with work placed in the lathe and retracted according to the rotary shifting of said cover plate relative to said disc plate.

WILLIAM H. HEATON, Jr.

REFERENCES CITED

The following references are of record in the file of this patent:

UNITED STATES PATENTS

| Number | Name | Date |
|---|---|---|
| 868,471 | Oubridge | Oct. 15, 1907 |
| 1,095,304 | Weiss | May 5, 1914 |
| 1,481,191 | Elliott et al. | Jan. 15, 1924 |
| 1,812,221 | Spencer | June 30, 1931 |
| 1,849,249 | Riddell | Mar. 15, 1932 |
| 2,290,731 | Blazek | July 21, 1942 |